No. 678,441. Patented July 16, 1901.
P. E. STEVENS.
SHEARS.
(Application filed Aug. 10, 1900.)
(No Model.)
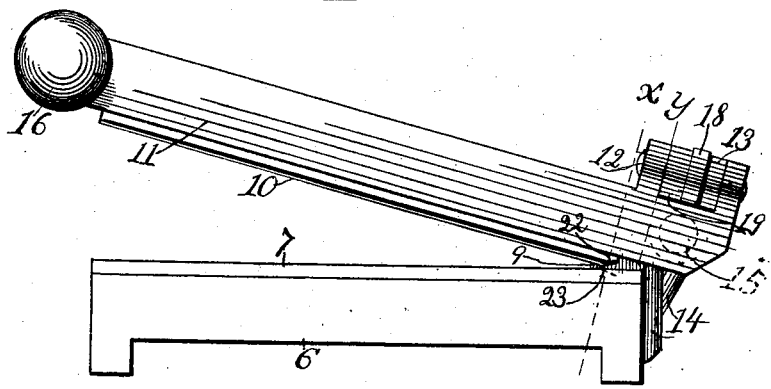
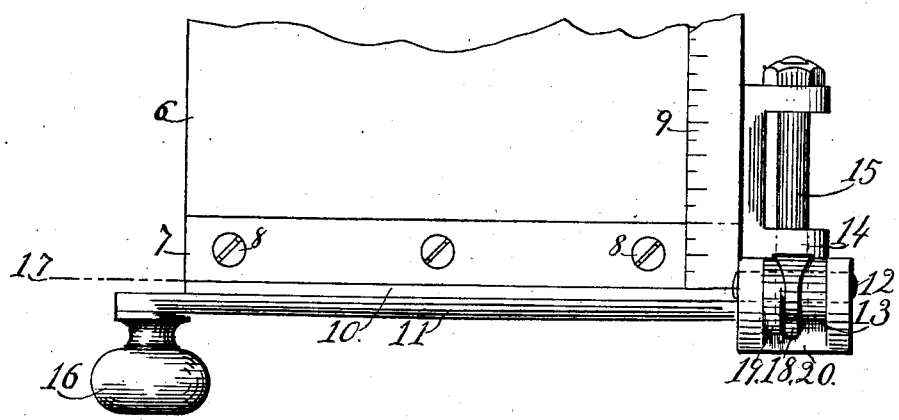
WITNESSES,
N. Stevens
C. W. Stevens
INVENTOR.
Perley Egbert Stevens,
by W. X. Stevens ATTY.

UNITED STATES PATENT OFFICE.

PERLEY EGBERT STEVENS, OF ST. PAUL, MINNESOTA.

SHEARS.

SPECIFICATION forming part of Letters Patent No. 678,441, dated July 16, 1901.

Application filed August 10, 1900. Serial No. 26,493. (No model.)

*To all whom it may concern:*

Be it known that I, PERLEY EGBERT STEVENS, a citizen of the United States, residing at St. Paul, in the county of Ramsey and State of Minnesota, have invented a new and useful Improvement in Shears; and I do hereby declare the following to be a full, clear, and exact description of the same, reference being had to the accompanying drawings.

This invention relates to shears for cutting sheet material. To operate well, the edges of two shear-blades should pass each other in close contact. Shear-blade edges are very obtuse, being little less than right angles, and sharpness in this case does not mean thinness of edge, but a perfectly-filled-out corner as an edge. Yet though the edges be thus sharp it is difficult to construct shearing-machines so accurately that the edges may be guided to pass each other in close contact and yet more difficult to preserve a close shearing contact when the machine becomes worn in service. It has therefore been a common practice heretofore to arrange the two blades of a pair of shears to overhang each other from heel to point, so that the blades grind across each other to some extent in operation, and it is a noticeable fact that to operate such shears without anything between them to be cut wears off their edges more rapidly than the legitimate work of cutting material with them, so that self-destruction is the normal tendency of such shears.

The object of the present invention is to adapt means for guiding the edge of the movable blade of a pair of shears to travel throughout its length in close contact with the stationary edge without crossing or overhanging at any point the plane of shearing contact while cutting and to accomplish this as readily when the mechanism becomes loose by long wear as when newly adjusted.

To this end my invention consists in the construction and combination of parts forming shears hereinafter more fully described, and particularly pointed out in the claims, reference being had to the accompanying drawings, in which—

Figure I represents in side elevation a pair of shears according to my invention. Fig. II is a plan view of the same, part of the table being broken away. Fig. III is a perspective view of one form of my movable blade and hanger. Fig. IV is a perspective view of the hinge-block. Fig. V is a vertical section of a pair of shears, showing the principle of operation. Fig. VI shows transverse vertical sections of the movable blade and hanger at the lines X and Y of Fig. I, all in accordance with my invention.

Numeral 6 represents the work-table of a pair of shears.

7 is the fixed blade, firmly secured to the table in any usual manner, such as by the screws 8.

9 is any usual gage or guide rule, located on the rear edge of the table for steadying the paper or other material in position to be cut.

10 is the movable blade, firmly fixed to a hanger 11, that is hung upon a hinge-pin at 12, which pin is in a vertical plane parallel with the vertical plane of the shearing or cutting edge of the fixed blade 7 and preferably a little in front or at the off-fall side of said shearing-plane, as shown in Figs. III and V, though for very light work it may be directly in the shearing-plane, as shown in Fig. II. In Figs. I and II the hinge-pin 12 is fixed in a hinge-block 13, that is hung upon a bracket 14 by means of a hinge-pin 15, the said bracket being firmly secured to the table 6. The hanger 11 is provided with a handle 16, by means of which the operator may swing the blade 10 up and down in operation. It will be seen that lifting this handle swings the blade 10 on its hinge 12 away from the fixed blade 7, so that there is no wear on the edges by this return movement. The amount of this swinging motion is limited by the portion 20 of the hanger 11 being stopped against the shoulder-lug 19 on the hinge-block 13. It will also be seen that pressing down upon the handle to do shearing swings the movable blade into facial contact with the stationary blade, and the proportion of the whole power used in pressing the blades facially together and in moving the block to do shearing may be regulated by lengthening or shortening the handle 16 radially from the axial pin 12. In this respect the result would be materially the same whether the pin 12 were located in a plane in front of the plane 17 of shearing contact, as now shown, or in the plane 17 or to the rear (the left hand in Figs.

V and VI) thereof; but the hinge-pin 12 is preferably located, as shown, in a plane at the off-fall side of the cutting-plane 17 and parallel therewith in order that the pressure of the blade 10 upon the work in the act of shearing may act to close the blades face to face in shearing contact, so that if blades were hung to be operated wholly by machinery, as the blade shown in Fig. III is adapted to be, the working pressure upon the hinge-pin 12 would tend to close the blades face to face, and the degree of such closing pressure may be regulated by locating the pin 12 nearer to or farther from the cutting-plane 17 relatively to the distance of the edge of blade 10 from the said pin 12.

18 represents a spring acting between the block 13 and hanger 11 and of sufficient force to hold the hanger with the blades normally face to face ready for work. If the blade 10 be swung over back so far as to pass out of contact with blade 7, the portion 20 of its hanger will rest against the face 21 of the hinge-block 13, (see Fig. VI,) permitting the heel of the upper blade to overhang the lower one a little, and to guide the upper blade back to the cutting-plane the heels of both blades are ground off at the corners 22 23 to serve as incline planes. These inclined planes are beyond the cutting range of the shears (see Fig. I) and there is no time that one of these blades overhangs the other or crosses the cutting-plane when at work. I have shown both blades 7 10 as having straight edges; but the blade 10 may be curved as much as usual in table-shears and not materially change the result described. The hinge-pin 12 is, as shown, at right angles to the swinging hinge-pin 15 and parallel with the plane 17 of the shear edges; but variations from these exact positions of the parts may be made within the limits of my invention so long as one of the blades is hung upon a hinge-pin and corresponds in action to the hanger 11 on the pin 12 to permit that blade to swing to and from the other blade in a direction nearly perpendicular to the cutting-plane at their cutting-point during work. The block 13 might be mounted to slide in ways with relation to the stationary blade 7, and it might be long enough to receive such a hanger 11 as is shown in Fig. III and to support the same throughout its length. While the blades may be slanted to give clearance, as shown in Fig. V, the edge of the moving blade if straight is always in the shearing-plane and this peculiar hanging forces the movable blade to swing into close shearing contact face to face with the fixed blade at every cutting-point throughout their whole length while at work, even though the hangings may be loose and out of adjustment, and these blades cannot grind across each other. Thus perfect service and long life to these shears are insured without material increase in their cost over old styles.

Having thus fully described my invention, what I believe to be new, and desire to secure by Letters Patent, is the following:

1. Shears having one of the blades hung to swing to and from the cutting-plane in a direction nearly perpendicular to the said plane at the cutting-line, while at work.

2. Shears having one blade hung to operate in facial contact with the other blade; one of the said blades adapted to swing to and from the face of the other blade while at work.

3. Shears having a blade hinged substantially parallel with its own cutting edge to swing to and from the cutting-plane; the hinge being located at that side of the said plane at which pressure of the blade upon the work tends to force the said blade into facial contact with the fixed blade, substantially as described.

In testimony whereof I affix my signature in presence of two witnesses.

PERLEY EGBERT STEVENS.

Witnesses:
HENRY K. WILLARD,
JNO. L. NORWOOD.